United States Patent (10) Patent No.: US 12,454,296 B2
Griebel et al. (45) Date of Patent: Oct. 28, 2025

(54) METHOD AND APPARATUS WITH AN AXLE COUNTER FOR OPERATING A RAILROAD CROSSING, COMPUTER PROGRAM PRODUCT AND DELIVERY APPARATUS FOR THE COMPUTER PROGRAM PRODUCT

(71) Applicant: Siemens Mobility GmbH, Munich (DE)

(72) Inventors: Stephan Griebel, Wolfenbüttel (DE); Jens Braband, Braunschweig (DE)

(73) Assignee: Siemens Mobility GmbH, Munich (DE)

( * ) Notice: Subject to any disclaimer, the term of this patent is extended or adjusted under 35 U.S.C. 154(b) by 583 days.

(21) Appl. No.: 17/950,278

(22) Filed: Sep. 22, 2022

(65) Prior Publication Data

US 2023/0091168 A1 Mar. 23, 2023

(30) Foreign Application Priority Data

Sep. 22, 2021 (EP) .................................... 21198362

(51) Int. Cl.
*B61L 29/32* (2006.01)
*B61L 1/16* (2006.01)

(52) U.S. Cl.
CPC ................. *B61L 29/32* (2013.01); *B61L 1/16* (2013.01); *B61L 2201/00* (2013.01)

(58) Field of Classification Search
CPC .. B61L 29/32; B61L 29/22; B61L 1/16; B61L 2201/00
See application file for complete search history.

(56) References Cited

U.S. PATENT DOCUMENTS 9,493,176 B2 11/2016 Busse et al.
11,851,096 B2 * 12/2023 Shahbazi Avarvand ...................
B61L 29/32
(Continued)

FOREIGN PATENT DOCUMENTS

AU 2021245132 A1 5/2022
DE 102009009449 * 8/2010 .............. B61L 1/161
(Continued)

OTHER PUBLICATIONS

Translation of DE 102009009449 A1 (Year: 2010).*

*Primary Examiner* — S. Joseph Morano
(74) *Attorney, Agent, or Firm* — Laurence A. Greenberg; Werner H. Stemer; Ralph E. Locher

(57) ABSTRACT

A method for operating a railroad crossing includes using an axle counter to capture measurement data for rail vehicles approaching the railroad crossing during passage of the rail vehicle. The velocity and the acceleration of the rail vehicle are calculated from the measurement data as properties of the rail vehicle by arithmetic measures. A time of closure is specified for triggering a closure of the railroad crossing as a function of the calculated properties of the rail vehicle. The velocity and the acceleration are calculated from the measurement data of the axle counter. The time of closure of the railroad crossing is specified with reference to the calculated velocity and the calculated acceleration as the rail vehicle is leaving the axle counter. An apparatus for operating a railroad crossing, a computer program product and a delivery apparatus for the computer program product are also provided.

13 Claims, 4 Drawing Sheets

(56) References Cited

U.S. PATENT DOCUMENTS

| | | |
|---|---|---|
| 2014/0191090 A1 | 7/2014 | Busse et al. |
| 2020/0171134 A1* | 6/2020 | Harp et al. .............. B61L 29/22 |
| 2021/0229716 A1* | 7/2021 | Carlson et al. ......... B61L 29/22 |
| 2022/0111879 A1* | 4/2022 | Clauer et al. ............. B61L 1/16 |

FOREIGN PATENT DOCUMENTS

| | | |
|---|---|---|
| DE | 102011079186 A1 | 1/2013 |
| EP | 0530743 A2 | 3/1993 |
| EP | 2718168 B1 | 6/2017 |
| EP | 3984856 A1 | 4/2022 |

\* cited by examiner

METHOD AND APPARATUS WITH AN AXLE COUNTER FOR OPERATING A RAILROAD CROSSING, COMPUTER PROGRAM PRODUCT AND DELIVERY APPARATUS FOR THE COMPUTER PROGRAM PRODUCT

CROSS-REFERENCE TO RELATED APPLICATION

This application claims the priority, under 35 U.S.C. § 119, of European Patent Application EP 21198362.2, filed Sep. 22, 2021; the prior application is herewith incorporated by reference in its entirety.

FIELD AND BACKGROUND OF THE INVENTION

The invention relates to a method for operating a railroad crossing, in which, for rail vehicles approaching a railroad crossing,
- an axle counter captures measurement data during the passage of the rail vehicle,
- by arithmetic measures, the velocity of the rail vehicle and the acceleration of the rail vehicle are calculated as properties of the rail vehicle from the measurement data, and
- as a function of the calculated properties of the rail vehicle, a time of closure is specified for the purpose of triggering a closure of the railroad crossing.

The invention further relates to an apparatus for operating a railroad crossing, comprising
- at least one axle counter for capturing measurement data as the rail vehicles pass, and
- a computer which is configured to calculate, by arithmetic measures, the velocity of the rail vehicle and the acceleration of the rail vehicle as properties of the rail vehicle from the measurement data, and to close the railroad crossing for rail vehicles approaching the railroad crossing.

Lastly, the invention relates to a computer program product and a delivery apparatus for the computer program product, wherein the computer program product comprises program instructions for performing the method.

European Patent EP 2 718 168 B1, corresponding to U.S. Pat. No. 9,493,176 B2, relates to a method for operating a railway safety system having at least one trackside device, taking into account a measured velocity value that is captured when the rail vehicle enters the activation section of the railway safety system. When the rail vehicle enters the activation section, the measured velocity value is used as a basis for checking whether a correction time for forwarding a report from the one trackside device to an assigned railway safety assembly should be set as a function of the measured velocity value. Thereafter, a set correction time is checked to determine whether it should remain effective, depending on at least one further influencing variable of the rail vehicle, wherein the influencing variable determines the travel time.

The later published European application having the file number 20202457.6 describes how, with the aid of axle counters, pattern detection of rail vehicles can be performed in such a way that train types can be detected on the basis of calculated axle spacings. It is also possible inter alia to operate a railroad crossing with an optimized time of closure using knowledge of the train types, wherein the times of closure can be postponed to a later time point in the case of freight trains, for example.

SUMMARY OF THE INVENTION

It is accordingly an object of the invention to provide a method and an apparatus with an axle counter for operating a railroad crossing, which overcome the hereinafore-mentioned disadvantages of the heretofore-known methods and apparatuses of this general type and which detect properties of the train with sufficient reliability, as far as possible without having to install additional sensor technology, for a railroad crossing to be operated by using an optimized time of closure. The object of the invention is additionally to indicate a computer program product, together with a delivery apparatus for the computer program product, through the use of which the aforementioned method can be performed.

This object is inventively achieved by the claimed subject matter (method) indicated in the introduction, specifically in that the velocity and the acceleration are calculated from the measurement data of the axle counter, and the time of closure of the railroad crossing is specified with reference to
- the calculated velocity as the rail vehicle is leaving the axle counter, and
- the calculated acceleration as the rail vehicle is leaving the axle counter.

As a result of using the axle counter to calculate the velocity and the acceleration of the rail vehicle, the axle counter (which can also be embodied as a dual axle counter) can advantageously be deployed for the purpose of capturing multiple types of property of the rail vehicle, those properties being important for the time of closure of the railroad crossing. In a preferred embodiment, the axle counter alone is deployed for the purpose of calculating measured values for all properties that will be used in the specification of the time of closure of the railroad crossing.

The overhead in respect of hardware required to capture the properties of the rail vehicle are thereby advantageously reduced. This also means that the reliability can be increased when the method is performed. Axle counters are highly reliable components and the deployment of other sensors, which would reduce the overall reliability of the method, can be avoided thus.

A further advantage is that the location of the axle counter is known precisely and therefore the measured values can be assigned directly to this location. The use of location-finding methods, from which it is also possible to compute reference variables such as velocity and acceleration, has additional measurement uncertainties which can be avoided when the inventive method is performed.

The rail vehicle can be formed of individual vehicles or a train, the latter occurring considerably more frequently in the approach region to railroad crossings.

In the context of the invention, the time of closure is understood to be the time point at which the railroad crossing is closed. The time of closure could therefore also be referred to as the time point of closure. By contrast, the period of closure defines the period during which the railroad crossing remains closed, starting with the time of closure. The period of closure is followed by the time of opening, at which time the railroad crossing is opened again.

The great advantage when applying the method to railroad crossings is that times of closure of the railroad crossing can advantageously be set individually as a function of the properties of the approaching train. At least, if the properties of the train can be reliably detected, the time of closure can in many cases be postponed to a later time point without resulting in unacceptably low safety standards during operation of the railroad crossing. This benefits the crossing traffic, which in many cases has a shorter time to wait at the railroad crossing.

For example, the following measurement principles of axle counters can be used for the purpose of calculating the properties:

Direction of travel of the train: by comparing the influence in the case of dual sensors (e.g. by evaluating the time delay in the signal generation).

Velocity of the train as an axle passes: from the spacing of the dual sensors, e.g. by evaluating the time delay in the signal generation, or from the time interval between the traversal of the estimated wheel midpoints in the case of known axle spacings.

Average velocity as the train passes and/or acceleration as the train passes: by averaging over various wheels or numerical derivation of the velocity.

In the context of the invention, "by arithmetic measures" or "computer-based" are understood to mean an implementation of the method in which at least one computer or processor executes at least one method step of the method.

The expressions "arithmetic unit" or "computer" include all electronic devices having data processing properties. Computers can be e.g. personal computers, servers, hand-held computers, mobile radio devices and other communication devices that process data by arithmetic measures, processors and other electronic devices for data processing, which can preferably also be amalgamated into a network.

In the context of the invention, a "processor" is understood to be e.g. a converter, a sensor for producing measurement signals or an electronic circuit. In particular, a processor can be a central processing unit (CPU), a microprocessor, a microcontroller or a digital signal processor, possibly combined with a storage unit for storing program instructions, etc. A processor is also understood to be a virtual processor or a soft CPU.

In the context of the invention, a "storage unit" is understood to be e.g. computer-readable memory in the form of random-access memory (RAM) or a data storage unit (hard disk or data medium).

"Interfaces" can be hardware-based, e.g. as cables or a radio connection, and/or software-based, e.g. as an interaction between individual program modules or program parts of one or more computer programs.

A "cloud" is understood to be an environment for "cloud computing." This refers to an IT infrastructure which is made available through interfaces of a network such as the Internet. It usually contains storage space, computing power or software as a service, without these having to be installed on the local computer which is using the cloud. The services offered in the context of cloud computing cover the whole spectrum of information technology, including inter alia infrastructure, platforms and software.

"Program modules" are understood to be individual function units which allow the program to be executed according to the invention. These function units can be realized in a single computer program or in a plurality of computer programs which communicate with each other. The interfaces that are realized in this context can be implemented as software within a single processor or as hardware if a plurality of processors are used.

Unless otherwise stated in the following description, the terms "create," "identify," "compute," "generate," "configure," "modify" and the like preferably relate to processes which produce and/or change data and/or which transform data into other data. In this case, the data is present in the form of physical variables in particular, e.g. as electrical pulses or also as measured values. The required specifications and program instructions are combined in a computer program as software. Furthermore, the terms "send," "receive," "read in," "read out," "transfer" and the like relate to the interaction of individual hardware components and/or software components through interfaces.

According to an embodiment of the invention, when specifying the time of closure, provision is made for a standard time of closure to be postponed at least once, in particular to a later time of closure.

The advantage of using the standard time of closure as stated above is both that safe operation of the railroad crossing can be assured without exception and that flexible adaptation of the times of closure is possible if the properties of the approaching train can be specified with sufficient reliability.

According to an embodiment of the invention, provision is made for the calculated property of the velocity to be taken into account in such a way that, with reference to the distance of the axle counter from the railroad crossing, the arrival of the rail vehicle at the railroad crossing is specified.

If the distance of the axle counter from the railroad crossing is known, the arrival time of the rail vehicle at the railroad crossing can be computed directly therefrom. Depending on how long the railroad crossing must be closed before arrival of the rail vehicle, the time of closure can be computed directly therefrom. If a specific distance of the rail vehicle from the railroad crossing is required as a triggering criterion, the time of closure can likewise be computed therefrom. However, this computation does not take into account any acceleration values that were calculated by the axle counter (further details below).

According to an embodiment of the invention, provision is made for the calculated property of the acceleration to be taken into account in such a way that, with reference to the distance of the axle counter from the railroad crossing and the property of the acceleration, the arrival of the rail vehicle at the railroad crossing is specified.

The acceleration provides information about the way that the anticipated time point at which the rail vehicle traverses the railroad crossing is influenced by the acceleration state of the train. A time of closure which is derived solely from the observation of the velocity of the rail vehicle must therefore be corrected accordingly.

In this case, it is advantageously possible to proceed from the least favorable case in which the rail vehicle is (further) accelerated until it reaches the railroad crossing. If the vehicle is being negatively accelerated (i.e. retarded) as it is leaving the axle counter, this can likewise be taken into account since this (compared with a constant velocity) postpones the time point at which the railroad crossing is reached until a later time point. It is also possible in this case to allow for the least favorable case, in which the operating state can switch from decelerating to accelerating after leaving the axle counter.

According to an embodiment of the invention:
a first further property, namely whether the rail vehicle is a passenger train or a freight train, is calculated by arithmetic measures on the basis of the calculated axle spacings,
in a first checking step during the calculation of the first further property, it is checked whether identical or similar patterns can be identified in at least a predominant share of the sequence of axle spacings, and if no pattern could be identified, the rail vehicle is assigned the property of a freight train as a first further property, or if a pattern was identified, the rail vehicle is assigned the property of a passenger train as a first further property and/or a further checking step is performed.

In other words, provision is advantageously made for estimating the spacings of the axles of the trainset from the raw data of the axle counter during the passage of the train. In particular, passenger trains such as ICE or regional trains are formed of fixed units which usually stay together and from which no cars are decoupled. Therefore, as a result of associating these units, there are patterns which can be measured multiple times one after the other and which are similar to each other. This means that passenger trains effectively have a fixed "fingerprint," which only changes as a result of measurement errors, etc.

By contrast, in the case of freight trains, other patterns are present which are usually variable and therefore not similar or identical, depending on which units and how many units are coupled together. The data can therefore be represented as multidimensional vectors whose components estimate the spacings between the axles, i.e. axle 1 to axle 2 and so on until axle n−1 to axle n (assuming n axles of the train, up to 250 in reality).

The terms "identical" and "similar" are intended to be understood in the sense of pattern detection. This means that a comparison of patterns can result in the patterns being assessed as identical or similar (or simply as not identical and not similar, i.e. not related). This assessment is preferably effected by arithmetic measures.

Patterns are understood to be identical if all check criteria during the pattern comparison give the result that there is agreement with the check criteria. Since the check criteria are based on measured values, it is possible in this context to define a tolerance range for the measurement, within which range the check criterion may lie in order to be understood as identical.

Patterns are understood to be similar if an evaluation of the check criteria shows that these correspond at least largely to each other. It should be noted in this case that similarity is also present if the patterns are identical.

The point at which it can be confirmed that the criteria correspond at least largely to each other, must be defined in order to perform the pattern detection. When detecting the cited first further property (freight train or passenger train), the following relationships generally apply in this case. The stricter the criteria for the detection of similarity, the greater the probability that the detected similar patterns do in fact always result in the detection of passenger trains. However, the probability also increases that passenger trains are not detected. The less strict the criteria for the detection of similarity, the higher the probability that all passenger trains are detected. However, the probability also increases that freight trains are inadvertently detected as passenger trains.

Irrespective of the strictness of the criteria, the method according to the invention functions in a technical sense. In operation, it must however be calculated where an optimum lies with regard to the strictness of the criteria in relation to safe operation.

A predominant share of the sequence of axle spacings is present if repeating patterns can be identified for more than 50% of the axle spacings. It is preferably also possible to define that the threshold at which a predominant share should be assumed is more than 60%, ideally more than 70%, 80% or The advantage of using pattern detection as part of train operation is based on the fact that parameters of the train operation, one such parameter being the time of closure of the railroad crossing, can be adapted in a flexible manner to the properties of the vehicles. It is thereby possible to achieve greater utilization of a line, for example.

In particular, the maximum acceleration capability of the detected train type can be taken into account (see above regarding measured values for speed and acceleration being taken into account). For example, this means that a passenger train can accelerate more quickly than a freight train. Therefore if a freight train is detected, the limited acceleration capability thereof can be taken into account in such a way that the railroad crossing can be closed later. The traffic crossing over is thereby spared from unnecessary waiting times that would otherwise arise if generic times of closure, which allow for the high acceleration capability of passenger trains, were computed for the freight train concerned.

According to an embodiment of the invention, provision is made in the second checking step for a number of axle spacings at the beginning of the sequence and/or a number of axle spacings at the end of the sequence to be disregarded in the sequence of axle spacings.

By disregarding a number of axle spacings at the beginning or at the end of the sequence of axle spacings, it is advantageously possible to ensure that locomotives or traction units, which form the beginning or the end of the train in the case of e.g. passenger trains, are not checked for the presence of patterns in the sequence of axle spacings. Both the locomotives and often also the traction units actually have different axle spacings (which are therefore characterized by different patterns) than the vehicles in the middle of the train, which vehicles are usually identical in the case of a passenger train and therefore generate similar or identical patterns. The first checking step can therefore be performed more quickly and reliably if it is limited to the middle part of the train in particular.

The quantity of axles to be disregarded depends on the train operation to be monitored. If the traction engines in use are known, the sequence of axle spacings to be disregarded corresponds to that of the locomotives or traction units in use. However, a generic value can also be assumed in the case of unknown locomotives and traction units. This may be four, six or eight axles, for example.

According to an embodiment of the invention, in the second checking step or in a further checking step, provision is made for calculating the magnitude of the axle spacings, the property of a passenger train being assigned to the rail vehicle as a first further property if the magnitude of the largest axle spacing that occurs in the pattern exceeds a defined limit value.

Which limit value allows reliable indication of passenger trains depends not least on the special characteristics of the respective train operation to be monitored. This limit value can therefore be specified as a function of a line if it is known which passenger trains run on the line concerned. It is important in this case to allow for the longest axle spacing in each case of the train cars concerned. However, if train cars are used which have different longest axle spacings, the shortest of the longest spacings in each case of the different train cars of passenger trains running on the line must be treated as a limit value.

According to a particularly advantageous alternative of the invention, this limit value can differ in a further respect from typical axle spacings of freight cars, so that the axle spacing can be used as a particularly reliable criterion for the differentiation from freight cars. Since the axle spacing is used as an additional (i.e. supplementary) criterion for the patterns to be detected, it is though not obligatory to satisfy this difference.

According to an embodiment of the invention, provision is made in the second checking step or in a further checking step for comparing the calculated pattern of the axle spacings with reference patterns of axle spacings and, if agreement of the pattern with a reference pattern is detected, assigning a train type to the rail vehicle as a second further property, the train type being associated with the reference pattern.

The reference patterns can be stored in a storage entity, for example. A server can provide the reference patterns so that comparison with the calculated patterns is possible. A further possibility is to store the reference patterns in a storage entity which forms an integral part of the axle counter. It is thereby possible to modify the axle counters technically with a certain intelligence, in other words as units which act autonomously or partially autonomously.

The advantage of storing reference patterns in a storage entity is that these are available at all times and can be retrieved as required without time delay. The storage entities can also store the various reference patterns according to the lines concerned, so that only specific reference patterns are provided to specific axle counters on specific line sections.

A parameter set that is suitable for the application case is advantageously selected from a parameter set which has been calculated in this way. For example, the wheel diameter can be omitted if it is more or less identical for all trains on the line. Location-specific representative data is then collected or measured and classified (e.g. passenger train, freight train) for the parameters in question. This data includes a finite number of whole-number or real-value measured values, e.g. the velocity and number of axles to give a graphic two-dimensional example. In other words, this represents a classification task as described below with reference to FIG. 5.

The collection of further parameters, in addition to the patterns for comparison, makes the detection of properties of vehicles less susceptible to errors generally. A higher degree of reliability can advantageously be achieved when detecting trains, and therefore the rail traffic can be controlled more effectively. A selection of parameters to be taken into account for a given control task depends on the conditions of the individual case. The parameters are selected as appropriate when configuring the control method.

According to an embodiment of the invention, provision is made for the criteria for the second checking step and/or further checking steps to be evaluated using a machine learning method.

Machine learning advantageously allows optimization of the current processes, i.e. reliable detection of the cited properties (in particular train types) during operation. In this way, the system is also able to adapt automatically to varying operating conditions. For example, additional patterns can be created if a new type of passenger trains is deployed on a specific line section. It is possible to use e.g. neural networks or other entities having artificial intelligence for this purpose.

In the context of this invention, artificial intelligence (also abbreviated to AI in the following) is understood to have the narrow sense of machine learning (also abbreviated to ML in the following) by arithmetic measures. This involves the statistical learning of parameterization by algorithms, preferably for complex application cases. Through the use of ML, the system detects and acquires patterns and regularities in the captured process data with reference to previously entered learning data. Using suitable algorithms, ML can autonomously find solutions to problems that arise. ML is organized into three fields: supervised learning, unsupervised learning and reinforcement learning, with more specific applications such as e.g. regression and classification, structure detection and prediction, data generation (sampling) or autonomous activities.

In the case of supervised learning, the system is trained by the relationship between input and associated output of known data, and acquires approximately functional relationships in this way. This depends on the availability of suitable and sufficient data, for if the system is trained using unsuitable (e.g. unrepresentative) data, it learns erroneous functional relationships. In the case of unsupervised learning, the system is likewise trained using exemplary data, but only with input data and without relationships to known outputs. It learns how to form and expand data groups, what is typical for the application case, and where variations or anomalies occur. It is thereby possible to describe application cases and detect error states. In the case of reinforcement learning, the system learns through trial and error, specifically by proposing solutions to given problems and receiving a positive or negative assessment of this proposal through a feedback function. The AI system learns to execute corresponding functions according to a reward mechanism.

Machine learning can also be performed e.g. by artificial neural networks (abbreviated to ANN in the following). Artificial neural networks are usually based on the networking of a multiplicity of neurons, e.g. McCulloch-Pitts neurons or slight variations thereof. Other artificial neurons can in principle also be used in ANN, e.g. the high-order neuron. The topology of a network (the assignment of connections to nodes) must be specified according to its task. The construction of a network is followed by the training phase in which the network "learns." In this case, a network can learn e.g. by the following methods:

developing new connections
deleting existing connections
changing the weighting (the weighting factor of neuron j to neuron i)
adapting the threshold values of the neurons where they have threshold values
adding or deleting neurons
modifying functions for activation, propagation or output.

Furthermore, the learning behavior changes in response to a change in the activation function of the neurons or the learning rate of the network. In practical terms, an ANN learns most from modification of the weighting factors of the neurons. Adaptation of the threshold value can be effected by an on-neuron in this case. ANNs are therefore able to acquire complicated non-linear functions by using a learning algorithm which tries, by using iterative or recursive procedures, to specify all parameters of the function from existing input values and desired output values. ANNs are a realization of the connectionistic paradigm in this case, since the function is formed of many simple homogeneous parts. Only as a totality does the method become complex.

According to an embodiment of the invention, provision is made for probability densities for the properties to be calculated from the measurement data of a multiplicity of measurements.

The knowledge of the probability densities allows the definition of classification limits for the assignment of properties. In this case, the method is advantageously very robust with regard to the classification limits because, given the comparatively low-dimensional problems according to the invention, it is possible to estimate the probability densities for both classes from the data (e.g. with density estimation of the measurement results) and therefore to calculate the error probabilities for an incorrect classification.

According to an embodiment of the invention, provision is made for a data pool to be used when specifying the time of closure, in which times of closure are associated with the calculated properties of the rail vehicles, in particular train types. These times of closure in the data pool can be used in particular as standard times of closure depending on the detected train type, and can be modified in accordance with the inventive method to provide a final specification of the time of closure, specifically by postponing this at least once, in particular to a later time of closure.

The data pool can be specified deterministically and/or created and/or developed further during operation with the aid of the machine learning methods explained above. As soon as the data is available in the data pool, use thereof can take place with short access times. The data in the data pool can be further optimized during operation, so that the train operation is progressively rationalized.

According to an embodiment of the invention, provision is made for a standard time of closure for the railroad crossing to be selected if the property of the rail vehicle could not be calculated.

According to the invention, a standard time of closure for the railroad crossing is understood to be that time of closure which can reliably prevent any danger to vehicular and pedestrian traffic that is crossing over, irrespective of the properties of the trains running on the line. Of critical significance in this case are the slow-moving freight trains which need longest from the point of triggering the track safety system to the railroad crossing and therefore require the longest time of closure. This can consequently be defined as the standard time of closure.

The object is also inventively achieved by the apparatus indicated in the introduction, in that the computer is configured to:
  calculate the velocity and the acceleration from the measurement data of the axle counter,
  specify a time of closure for the purpose of triggering a closure of the railroad crossing as a function of the calculated properties of the rail vehicle,
  wherein the time of closure of the railroad crossing is specified with reference to
    the calculated velocity as the rail vehicle is leaving the axle counter and
    the calculated acceleration as the rail vehicle is leaving the axle counter.

The apparatus has the same advantages as were previously explained in connection with the method described in detail above. The statements made in respect of the inventive method apply correspondingly to the inventive apparatus.

Also claimed is a computer program product, comprising program instructions for performing the cited inventive method and/or exemplary embodiments thereof, wherein the inventive method and/or exemplary embodiments thereof can be performed by using the computer program product in each case.

Also claimed is a delivery apparatus for storing and/or providing the computer program product. The delivery apparatus is e.g. a storage unit which stores and/or provides the computer program product. Alternatively and/or additionally, the delivery apparatus is e.g. a network service, a computer system, a server system, in particular a distributed e.g. cloud-based computer system and/or virtual arithmetic system, which preferably stores and/or provides the computer program product in the form of a data stream.

The provision takes place in the form of a program data block as a file, in particular as a download file, or as a data stream, in particular a download data stream, of the computer program product. This provision can however also take place as e.g. a partial download formed of a plurality of parts. Such a computer program product is read into a system, e.g. using the delivery apparatus, in such a way that the inventive method is then executed on a computer.

Further details of the invention are described below with reference to the drawing. Identical or corresponding elements of the drawing are denoted by the same reference signs in each case, and are only explained more than once if differences exist between the individual figures.

The exemplary embodiments illustrated below are preferred embodiment variants of the invention. With regard to the exemplary embodiments, the described components of the embodiment variants each represent individual features of the invention which must be regarded independently of each other, wherein the features also each develop the invention independently of each other and must therefore also be considered, individually or in combinations other than that shown, as an integral part of the invention. Furthermore, the described components can also be combined with the previously described features of the invention.

DETAILED DESCRIPTION OF THE INVENTION

Figure 1:
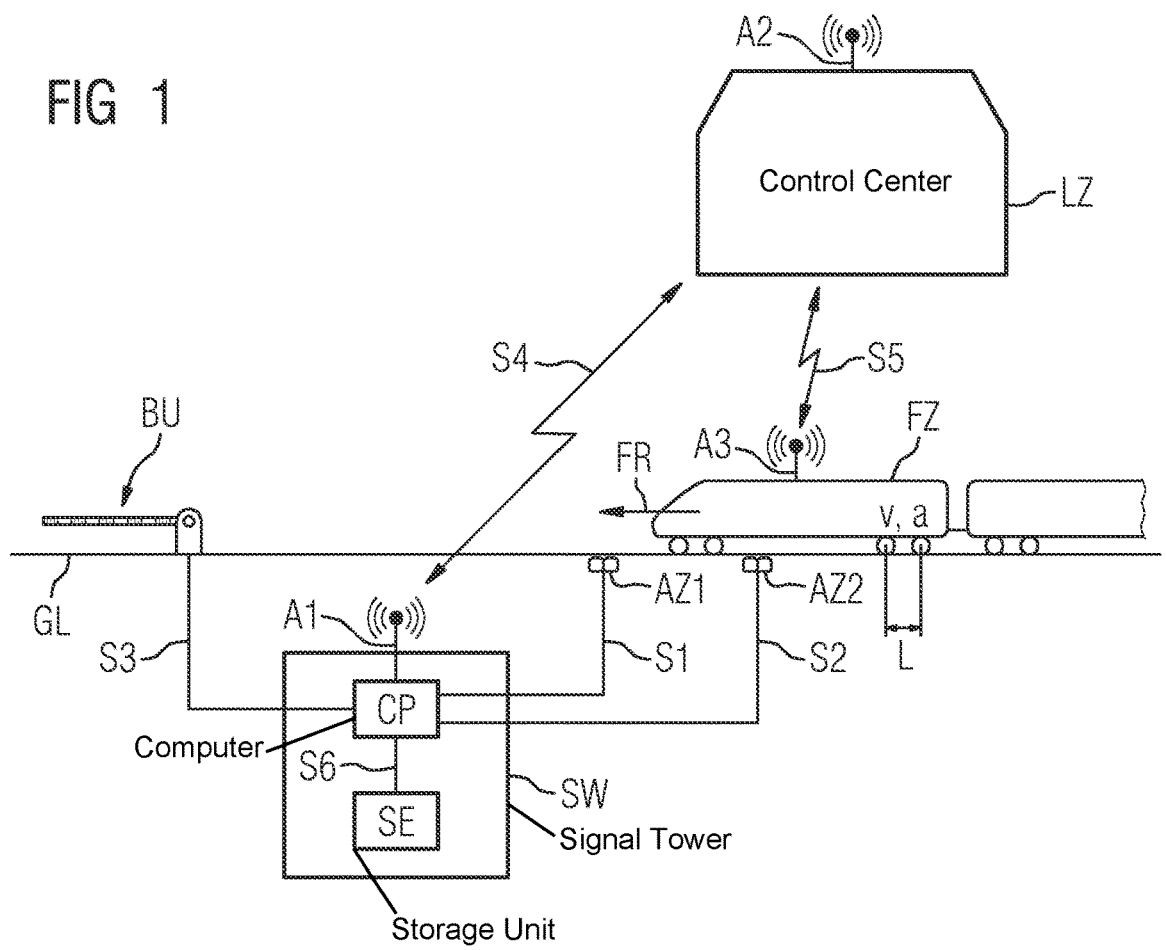
FIG. 1 is a diagrammatic, side-elevational view of a track and a vehicle with a schematically illustrated exemplary embodiment of the inventive apparatus with its active interdependencies.

Referring now to the figures of the drawings in detail and first, particularly, to FIG. 1 thereof, there is seen a track system including a track GL, a control center LZ and a signal tower SW. On the track GL, a vehicle FZ in the form of a train is traveling towards a railroad crossing BU. A first axle counter AZ1 and a second axle counter AZ2 are installed at the track GL and are configured in a conventional manner to count the axles of the vehicle FZ. The use of two axle counters provides redundancy in order to increase safety of the method against failure.

The first axle counter AZ1 and the second axle counter AZ2 are so-called dual axle counters, having two axle counting sensors each. The axle counting sensors are disposed one behind the other in the direction of travel of the trains, in such a way that they generate a measurement signal one after the other in quick succession. This measurement signal can be used in a conventional manner to calculate the direction of travel FR of the train and the velocity v of the train. It is also possible to calculate the axle spacings L (also designated by further capital letters in the following) from the velocity v. Illustrated in FIG. 1 is the axle spacing L of a bogie of the depicted vehicle FZ. If the progression of the velocity from axle to axle of the crossing train is observed, it is also possible to derive an acceleration value a from this observation (further details below).

The axle counter AZ1 is connected by a first interface S1, and the second axle counter AZ2 by a second interface S2, to the signal tower SW, specifically to a computer CP located in this signal tower. In addition, the computer CP has a third interface S3 for the railroad crossing BU. In addition, the computer CP is connected to a storage unit SE by a sixth interface S6.

The signal tower SW has a first antenna system A1, the control center LZ a second antenna system A2 and the vehicle FZ a third antenna system A3. In this way, communication is possible between the signal tower SW and the control center LZ by a fourth interface S4, and between the vehicle FZ and the control center LZ by a fifth interface S5. The fourth interface S4 and the fifth interface S5 are radio interfaces in this respect. The first interface S1, the second interface S2 and the third interface S3 can be both cable-based and radio interfaces, though the antenna equipment that would be required to form the radio interfaces is not shown for the latter case.

As the vehicle FZ on the track GL moves towards the railroad crossing BU, the axles of the vehicle FZ first traverse the second axle counter AZ2 and then the first axle counter AZ1. The recorded measured values can be transferred by the first interface S1 and the second interface S2 to the computer CP, the computer CP being configured to perform the inventive method. It is also possible in this way for the computer CP to directly assume responsibility for the activation of the railroad crossing BU. Alternatively, the computer CP can be connected by the third interface S3 to a further computer (not illustrated in FIG. 1), which is used for the purpose of activating the railroad crossing BU by a further interface.

Figure 2:
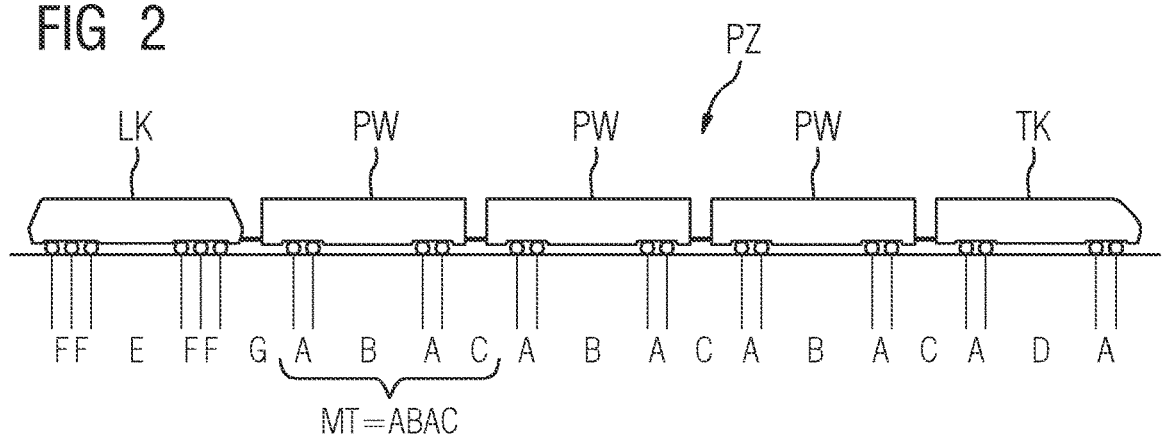
FIGS. 2 and 3 are side-elevational views illustrating partly identical or similar patterns of axle spacings for a passenger train and a freight train.

FIG. 2 shows a passenger train PZ traveling on the track GL, as the vehicle FZ from FIG. 1. This passenger train PZ is formed of a locomotive LK, a plurality of passenger cars PW and a traction unit TK at the opposite end of the passenger train PZ from the locomotive LK.

The axle spacings between the individual axles (indicated by wheels) are also schematically illustrated. It can be seen that various axle spacings occur more than once in the passenger train PZ, and therefore the sequence of axle spacings can be examined for the presence of patterns. The axle spacings are labeled by the capital letters A to G. The sequence of axle spacings is FFEFFGABACABACABACADA.

If the locomotive LK and the traction unit TK are disregarded, since these differ from the passenger cars PW in respect of their axle spacings, a repeating sequence of axle spacings is revealed for the consecutive passenger cars, these being structurally identical. To this extent, the axle spacings form a pattern MT which is indicated by a curly bracket for the passenger cars PW following the locomotive LK. The succession of axle spacings in the pattern MT shown in FIG. 2 is ABAC. This sequence of axle spacings is also revealed for the two following passenger cars.

Figure 3:
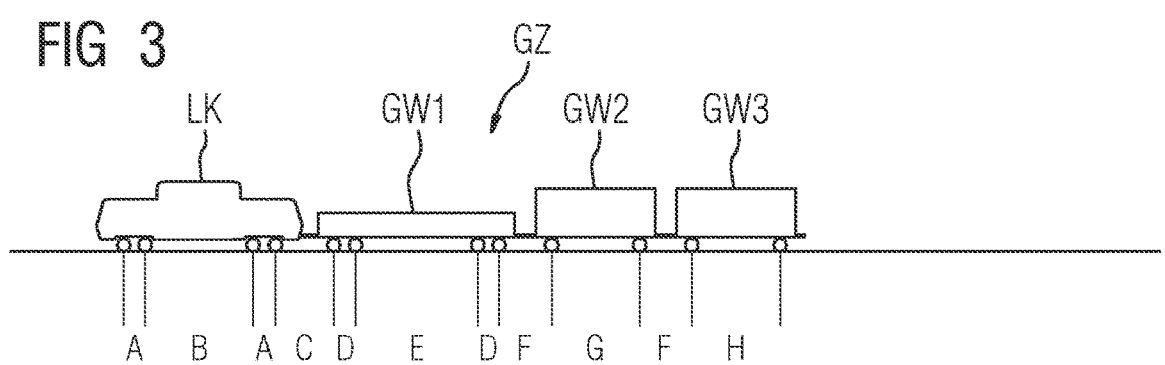

Different operating characteristics apply to the freight train GZ on the track GL illustrated in FIG. 3, that train being formed of a locomotive LK and a first freight car GW1, a second freight car GW2 and a third freight car GW3. These have differing lengths and differing numbers of axles and therefore a plurality of differing axle spacings is produced, these being denoted by the capital letters A to H. It is clear from FIG. 3 that no repeating patterns can be found in the illustrated sequence ABACDEDFGFH, thereby allowing a freight train to be inferred.

Figure 4:
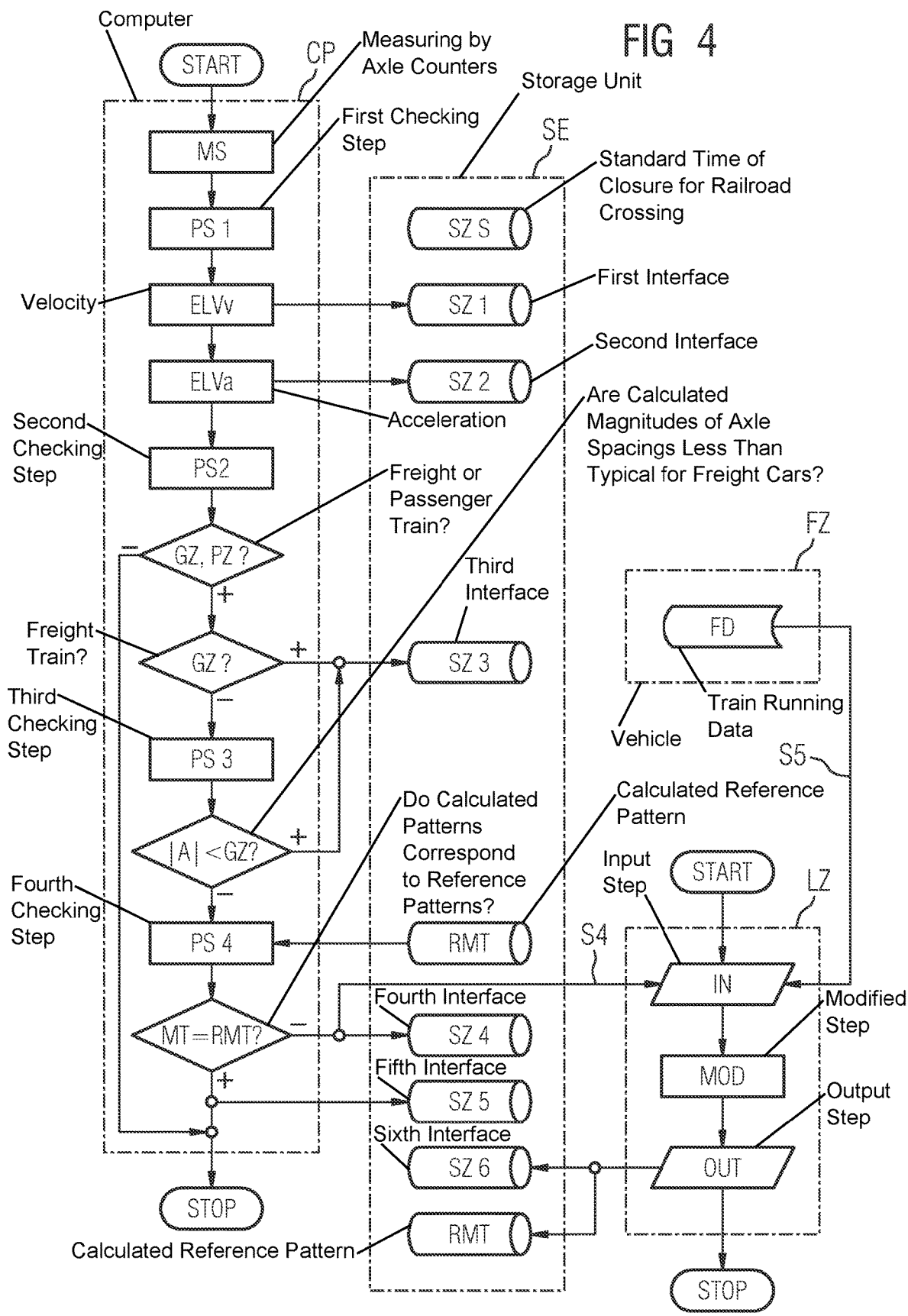
FIG. 4 is a flow diagram showing an exemplary embodiment of the inventive method, with the function units and interfaces as per FIG. 1 being indicated by way of example.

FIG. 4 shows how the inventive method can be executed. It is started initially in a first step START. At this time point, the time of closure of the railroad crossing BU is set to the value of a standard time of closure SZS. A dedicated storage area is reserved for this purpose in the storage entity and can be accessed by a control unit (e.g. the computer CP or a further computer not shown in FIGS. 1 to 3) of the railroad crossing in order to retrieve the currently stored time of closure.

This is followed by a measuring step MS which is performed by the relevant axle counter AZ1, AZ2 (cf. FIG. 1). In this measuring step, axle counting sensors of the two axle counters are used to calculate inter alia the respective velocity of the traversing wheels (representing the axle), spacings between the axles, the velocity of the axles, and the progression of the velocity from axle to axle and hence the acceleration, wherein the acceleration can be constant or progressive.

This measuring step is followed by a first checking step PS1, which is formed of an assessment step for the velocity ELVv and an assessment step for the acceleration ELVa, the effect of the velocity v of the train and the acceleration state a of the train during the passage over the axle counter being considered in each case.

The slower the train is traveling, the longer it will take to arrive at the railroad crossing BU. Therefore, the time of closure of the railroad crossing can be postponed to a later time point. Specifically, this means that the standard time of closure SZS, which allows for the least favorable case, can be corrected and a later time of closure SZ1 can be output to the storage entity SE.

It must be taken into consideration when assessing the acceleration that, due to the inertia of the train, the lower the acceleration when passing the axle counter the less the train can accelerate over the distance from the axle counter to the railroad crossing BU. Assuming the least favorable case, in which the train is accelerated at a maximum typical rate for the train type concerned after leaving the axle counter, it will be necessary to correct the time of closure (as a second time of closure SZ2) to an earlier time of closure in most cases. However, if the train is being negatively accelerated, i.e. retarded, the retarding effect must first be overcome before any positive acceleration. This can also be taken into account by specifying a later time of closure, which is output as a second time of closure SZ2 to the storage entity SE.

This is followed by a second checking step PS2, in which the sequence of axle spacings (as described in relation to FIG. 2 and FIG. 3) can be calculated and checked. In this case, it is either possible to detect patterns MT in the sequence of axle spacings or not. A query step GZ, PZ? following thereupon checks whether a freight train GZ or a passenger train can be inferred on the basis of the succession of axle spacings (as a result of finding patterns). If this is not the case, the second time of closure SZ2 is kept.

If the first property can be specified, i.e. the question of whether a freight train GZ or a passenger train PZ is concerned, a further query step GZ? then takes place in the computer CP, namely whether the train is a freight train GZ. If this is the case, a third modified time of closure SZ3 is transferred to the storage unit SE (replacing a previously stored time of closure). If the train is not a freight train or a clear result is not present, a second checking step PS2 is performed in the computer CP.

The third checking step PS3 is used to calculate the magnitudes of the axle spacings. In a checking step |A|<GW following thereupon, it can therefore be queried whether the calculated magnitudes of the axle spacings are less than a typical limit value for freight cars GW. If this is the case, the train is a freight train GZ and therefore the third modified time of closure SZ3 can be transferred to the storage unit SE (replacing a previously stored time of closure). If this is not the case, a fourth checking step PS4 is initiated in the computer CP.

In the fourth checking step PS4, reference patterns RMT are downloaded from the storage unit SE. The axle spacings or their magnitudes are now compared with the reference patterns, a checking step MT=RMT? being used to check whether the calculated patterns MT correspond to a reference pattern RMT. If this is not the case, a fourth modified time of closure SZ4 is transferred to the storage unit SE (replacing a previously stored time of closure). If a pattern MT is however detected, a fifth modified time of closure SZ5 which specifically suits the reference pattern RMT can be transferred to the storage unit SE (replacing a previously stored time of closure).

The modified times of closure SZ3, SZ4, SZ5, SZ6 cited above are times of closure which are computed on the basis of the times of closure that were calculated in the first checking step, and are modified in this sense. In other words, the knowledge obtained in the first checking step in respect of velocity and acceleration of the approaching train also goes into the modified times of closure, in which the train type is also taken into account. In other words, refinements are effected relating to train type, each allowing a progressively accurate specification of the time of closure, wherein by virtue of this additional knowledge the operational safety of the railroad crossing is not compromised.

If the answer to the query step MT=RMT? is negative, the calculated new pattern MT can also be transferred to the control center LZ by the interface S4. At the same time, train running data FD can also be transferred from the vehicle FZ to the control center LZ by the fifth interface S5. On the basis of the data available in the control center LZ, a new, sixth modified time of closure SZ6 which is adapted to the calculated train type can then be calculated in a modification step MOD and transferred to the storage unit SE by an output step OUT. This sixth modified time of closure SZ6 can then be used as an individual time of closure for the railroad crossing BU (replacing a previously stored time of closure). At the same time, an output to the storage unit SE can take place to the effect that the sixth modified time of closure SZ6 together with the newly calculated reference pattern RMT, which belongs to the vehicle FZ that has just been analyzed, is written as additional information into the database in the storage unit SE.

In the storage unit SE, a time of closure for the railroad crossing BU is now present in the dedicated storage area. Depending on the execution of the method, this may be the standard time of closure SZS, the first time of closure SZ1, the second time of closure SZ2, the third modified time of closure SZ3, the fourth modified time of closure SZ4, the fifth modified time of closure SZ5 or the sixth modified time of closure SZ6 (or further times of closure, which are not described in the example according to FIG. 4).

This time of closure is now available in the dedicated storage area of the storage entity SE for transfer to the computer CP or to another control unit of the railroad crossing BU (not shown) when the railroad crossing BU is activated (cf. FIG. 1). In this respect, the railroad crossing BU can be operated by using an individually calculated time of closure.

Figure 5:
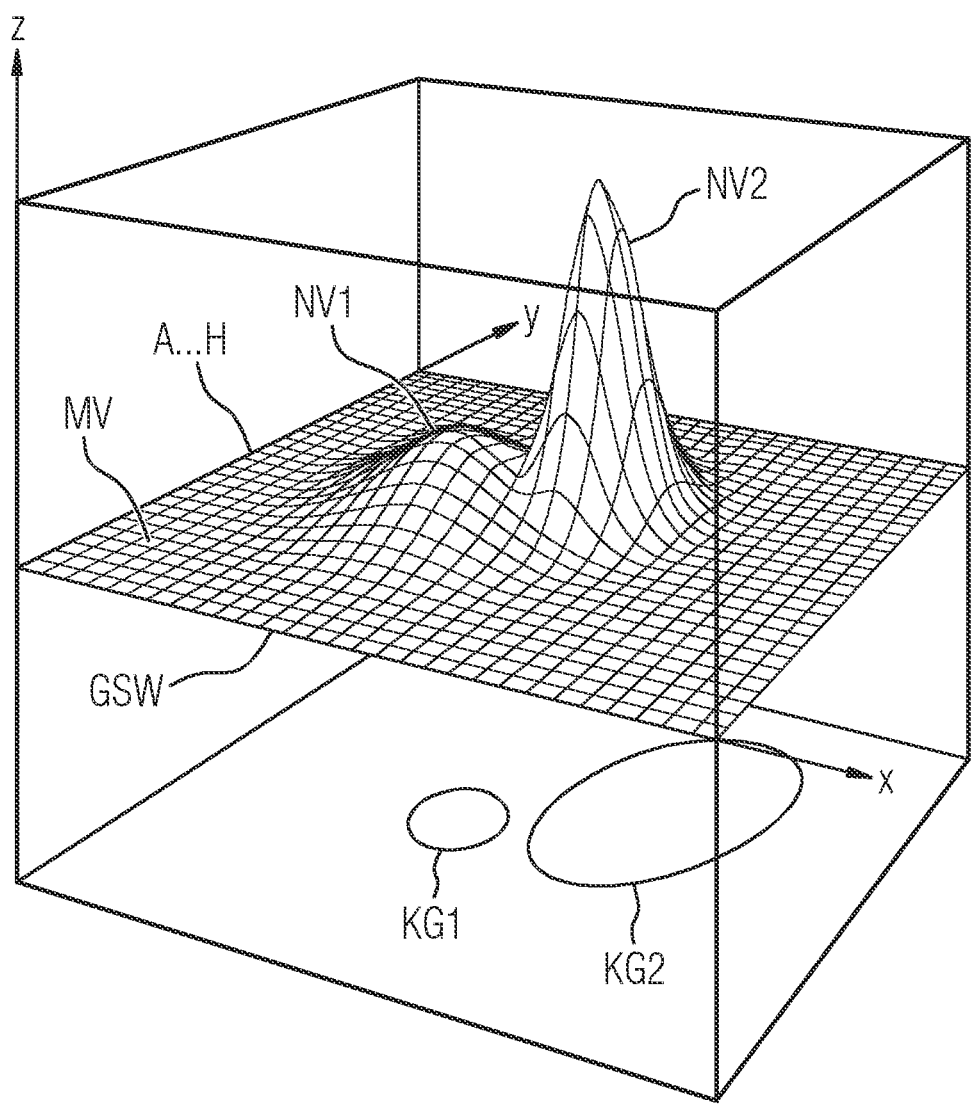
FIG. 5 is a perspective view symbolically showing two normal distributions for calculated measurement data, although this functions for all distributions in principle.

By way of example, FIG. 5 shows two parameters that have been measured or can be specified by the axle counters as per the invention, in abstract form on a plane, which can also be referred to as an x-y plane and on which the measured value distribution MV of the measured values can be seen. According to this, the velocity GSW is shown in the x-axis and the axle spacings A . . . H are shown on the y-axis. The z-axis is used to show the (e.g. estimated) probability densities.

In this example, location-specific representative data is collected or measured and classified for the parameters in question, e.g. passenger train as normal distribution NV2 and freight train as normal distribution NV1, as described above. That data includes a finite number of whole-number or real-value measurement data from the axle counters, e.g. the velocity and the axle spacing to give a graphic two-dimensional example. In other words, this represents a classification task as schematically illustrated in FIG. 5.

Assuming representative data is available, the use of machine learning methods (e.g. neural networks) to solve such pattern-detection problems is well-known. In this application, significant leeway is given in setting the classification limit in the case of axle counters, since it is also possible to estimate the probability densities for both classes from the data (e.g. by using density estimation) in the case of such low-dimensional problems. It is therefore possible to calculate the error probabilities for an incorrect classification (cf. e.g. Duda, et al.: Pattern Classification, Wiley, 2001). FIG. 5 shows this symbolically for a first normal distribution NV1 and a second normal distribution NV2, but this also functions for distributions other than normal distributions in principle.

Assuming in the example that the small ellipse is the first classification limit KG1 for freight trains and the large ellipse is the classification limit KG2 for passenger trains, it is then possible to compute the error probabilities using the estimated distributions. If the error classification probability for freight trains is too high, the classification limits can be changed. In the example according to FIG. 5, a smaller ellipse would then be obtained for the first classification limit KG1. There may however be applications where the classification errors are asymmetrical, i.e. the errors do not have the same significance. For example, with regard to safety, it would be irrelevant if a slow freight train was classified as a fast passenger train in the case of the time-controlled activation of a railroad crossing, but this would be dangerous in the case of prohibited opposing traffic in a tunnel. In other words, the safety aspect must be taken into consideration in every case when evaluating the error types and their probabilities.

Figure 6:
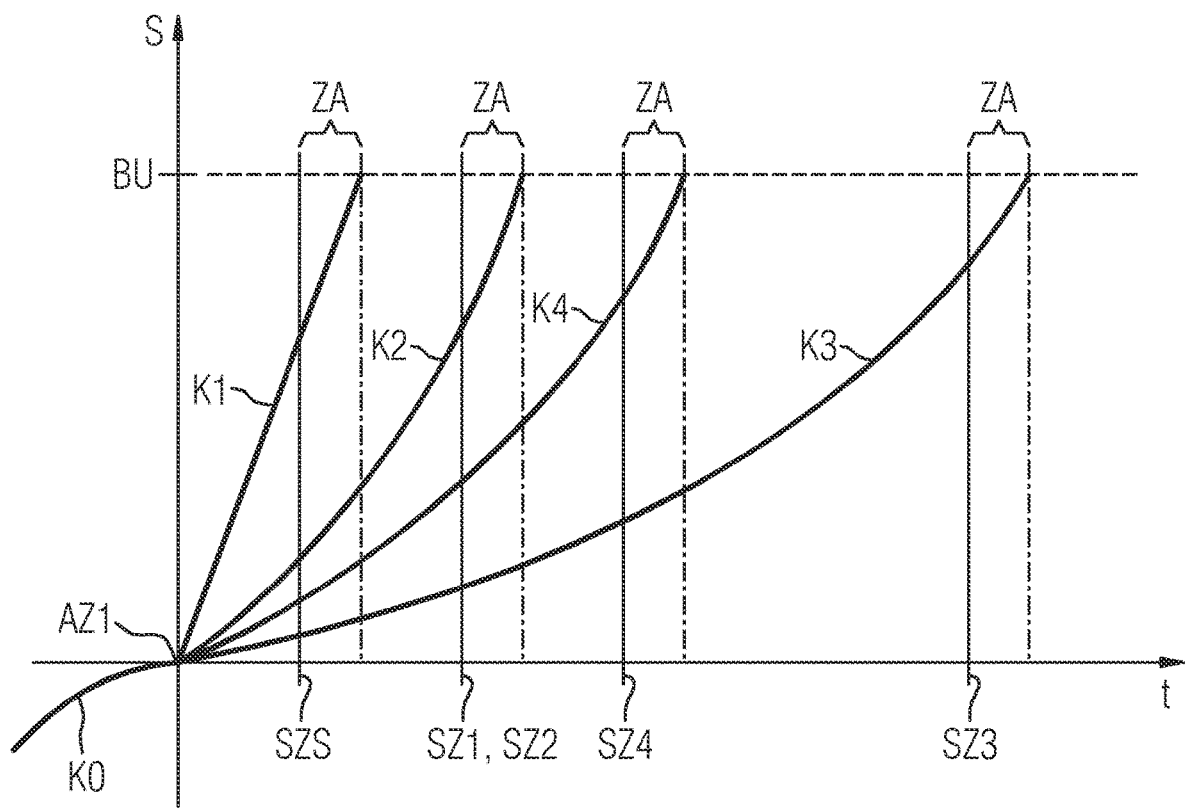
FIG. 6 is a diagram of the distance covered s over the time t showing various distance-time curves, which could characterize the crossing train (rail vehicle) after it has traversed the axle counters, depending on the properties of the train and the state of knowledge obtained from the axle counting.

FIG. 6 shows the line covered by trains in a distance-time diagram. The time t is shown on the x-axis and the line s covered by the trains is shown on the y-axis. Also shown on the y-axis are the positions of the first axle counter AZ1 and the railroad crossing BU, since the execution of the method is concerned with the management of this line and estimating the time required for this line.

The curves K1 to K4 show different profiles of the advance of a relevant train. These curves are used to compute times of closure SZS and SZ1 to SZ4. These are marked on the distance-time diagram and, in the exemplary embodiment according to FIG. 6, always have a constant time offset ZA relative to the planned arrival time of the vehicle at the railroad crossing BU. The arrival time point is represented by dash-dot vertical lines which intersect the x-axis at the respective arrival time points.

The zero point of the time axis is the time point at which the rail vehicle leaves the respective axle counter AZ1. Up until this time point, the velocity and the acceleration are captured on the basis of the axle counter results during the passage of the train, in such a way that the curve K0 represents a real measured profile. Irrespective of this profile, the standard time of closure SZS is provided and assumes the least favorable case for the approach of the rail vehicle to the railroad crossing. This is the constant for the maximum permissible speed on the line section, and therefore the curve K1 extends linearly in the distance-time diagram.

As explained in relation to FIG. 4, various specifications can be taken into account as a result of the calculation of velocity and acceleration in the steps ELVv and ELVk. As illustrated in FIG. 6, the rail vehicle was being retarded before it passed over the first axle counter AZ1 (cf. curve K0, which has a curvature to the right). Therefore the curve K2, which allows for the maximum acceleration of the fastest rail vehicle that operates on the line, can be assumed for the distance-time characteristic. The rail vehicle must first build up the velocity (i.e. transform the negative into a positive acceleration) and therefore a less critical scenario SZ1, SZ2 with a later time of closure can be assumed in comparison with the curve K1.

The curve K3 applies if a freight train is detected in the second checking step PS2 (cf. FIG. 4). As illustrated in FIG. 6, the freight train can only accelerate considerably more slowly and therefore, based on the third curve K3, the time of closure SZ3 can be postponed to later time points in comparison with the second curve K2.

However, if a passenger train is identified, a comparison with a reference pattern RMT can be made in the checking step PS4 in order to calculate the train type more accurately. Although it is a passenger train in the example according to FIG. 6, the train can be assigned the fourth curve K4 if it is found that its acceleration capability does not correspond to that of the fastest train operating on the line (cf. curve K2). Applying the fourth curve K4, the time point of closure SZ4 can also be postponed to a later time point in comparison with the second curve K2.

The following is a summary list of reference numerals and the corresponding structure used in the above description of the invention.

LIST OF REFERENCE SIGNS

GL Track
FZ Rail vehicle
BU Railroad crossing
LZ Control center
SW Signal tower
A1 . . . A3 Antenna
AZ1 . . . AZ2 Axle counter
S1 . . . S6 Interface
CP Computer
SE Storage unit
v Velocity
a Acceleration
PZ Passenger train
LK Locomotive
PW Passenger car
TK Traction unit
GZ Freight train
GW1 . . . GW3 Freight car
A . . . H, L Axle spacing
MT Pattern
RMT Reference pattern
GW Limit value
MS Measuring step
PS1 . . . PS3 Checking step
SZS Standard time of closure
SZ1 . . . SZ6 Time of closure (computed)
FD Train running data
IN Input step
MOD Modification step
OUT Output step
GZ? Query step freight train?
MV Measured value distribution
GSW Velocity
KG1 . . . KG2 Classification limit
NV1 . . . NV2 Normal distribution
s Distance (covered by the rail vehicle)
t Time
K1 . . . K4 Distance-time curves

The invention claimed is:

1. A method for operating a railroad crossing, the method comprising, for rail vehicles approaching a railroad crossing:
   using an axle counter to capture measurement data during a passage of the rail vehicle;
   using arithmetic measures to calculate a velocity of the rail vehicle and an acceleration of the rail vehicle as properties of the rail vehicle from the measurement data of the axle counter;
   specifying a time of closure for triggering a closure of the railroad crossing as a function of the calculated properties of the rail vehicle with reference to:
      a calculated velocity as the rail vehicle is leaving the axle counter, and
      a calculated acceleration as the rail vehicle is leaving the axle counter;
   calculating a first further property as to whether the rail vehicle is a passenger train or a freight train, by arithmetic measures based on calculated axle spacings;
   in a first checking step during the calculation of the first further property, checking whether identical or similar patterns can be identified in at least a predominant share of a sequence of axle spacings; and
      if no pattern could be identified, assigning to the rail vehicle a property of a freight train as the first further property, or
      if a pattern was identified, at least one of assigning to the rail vehicle a property of a passenger train as the first further property or performing a further checking step.

2. The method according to claim 1, which further comprises, when specifying the time of closure, modifying a standard time of closure by postponing the time of closure at least once or moving the time of closure to a later time.

3. The method according to claim 1, which further comprises taking a calculated property of the velocity into account, with reference to a distance of the axle counter from the railroad crossing, to specify an arrival of the rail vehicle at the railroad crossing.

4. The method according to claim 1, which further comprises taking a calculated property of the acceleration into account, with reference to a distance of the axle counter from the railroad crossing and with reference to the property of the acceleration, to specify an arrival of the rail vehicle at the railroad crossing.

5. The method according to claim 1, which further comprises, in a second checking step, disregarding at least one of a number of axle spacings at a beginning of the sequence or a number of axle spacings at an end of the sequence in the sequence of axle spacings.

6. The method according to claim 1, which further comprises in a second checking step or in the further checking step, calculating a magnitude of the axle spacings, and assigning to the rail vehicle a property of a passenger train as the first further property if a magnitude of a largest axle spacing occurring in the pattern exceeds a defined limit value.

7. The method according to claim 1, which further comprises, in a second checking step or in the further checking step, comparing the patterns of the axle spacings with reference patterns of axle spacings, and upon detecting an agreement of one of the patterns with one of the reference patterns, assigning to the rail vehicle, as a second further property, a train type associated with the one reference pattern.

8. The method according to claim 1, which further comprises using a machine learning method to evaluate criteria for at least one of a second checking step or the further checking step.

9. The method according to claim 1, which further comprises calculating probability densities for the properties by using measurement data from a multiplicity of measurements.

10. The method according to claim 1, which further comprises using a data pool in which times of closure are associated with the calculated properties or train types of rail vehicles to specify the time of closure.

11. A computer program product with instructions stored on a non-transitory delivery apparatus, that when the program instructions are executed by a processor, perform the method according to claim 1.

12. A non-transitory delivery apparatus for the computer program product according to claim 11, wherein the delivery apparatus at least one of stores or provides the computer program product.

13. An apparatus for operating a railroad crossing, the apparatus comprising:
  at least one axle counter for capturing measurement data as rail vehicles pass; and
  a computer;
  said computer configured to calculate, by arithmetic measures, a velocity of a rail vehicle and an acceleration of the rail vehicle as properties of the rail vehicle from the measurement data of the axle counter;
  said computer configured to close the railroad crossing for rail vehicles approaching the railroad crossing; and
  said computer configured to specify a time of closure for triggering a closure of the railroad crossing as a function of the calculated properties of the rail vehicle with reference to:
    the calculated velocity as the rail vehicle is leaving the axle counter, and
    the calculated acceleration as the rail vehicle is leaving the axle counter.

* * * * *